(No Model.)

J. McMASTER.
COMBINED BOX AND COOKING STOVE.

No. 399,918. Patented Mar. 19, 1889.

Witness,
Dane L. Corey
Charles W. Foote

Inventor,
John McMaster
by
H. T. Fisher
Attorney

UNITED STATES PATENT OFFICE.

JOHN McMASTER, OF DAYTON, OHIO.

COMBINED BOX AND COOKING STOVE.

SPECIFICATION forming part of Letters Patent No. 399,918, dated March 19, 1889.

Application filed August 31, 1888. Serial No. 284,225. (No model.)

*To all whom it may concern:*

Be it known that I, JOHN MCMASTER, a citizen of the United States, residing at Dayton, in the county of Montgomery and State of Ohio, have invented certain new and useful Improvements in Combined Box and Cooking Stoves; and I do hereby declare that the following is a full, clear, and exact description of the invention, which will enable others skilled in the art to which it appertains to make and use the same.

The invention relates to a combined box and cooking stove; and it consists in an ordinary box-stove modified to adapt it also to use as a cooking-stove of limited capacity, all as hereinafter described, and particularly pointed out in the claims.

Figure 3:
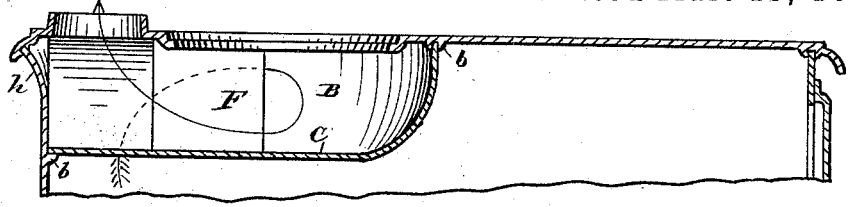
Figure 5:
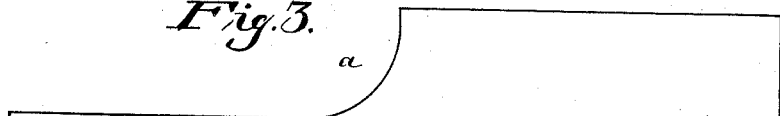
Figure 4:
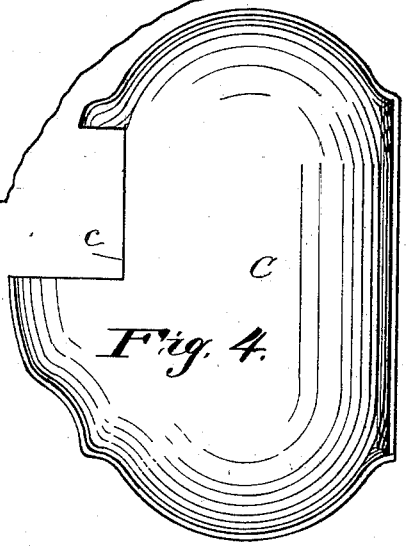
Figure 2:
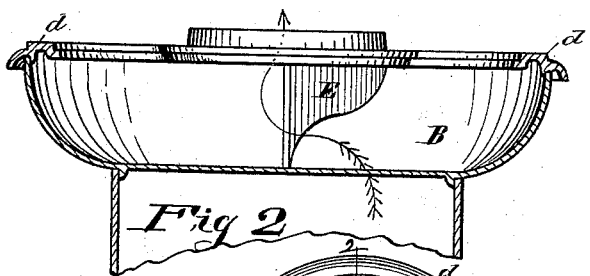
Figure 1:
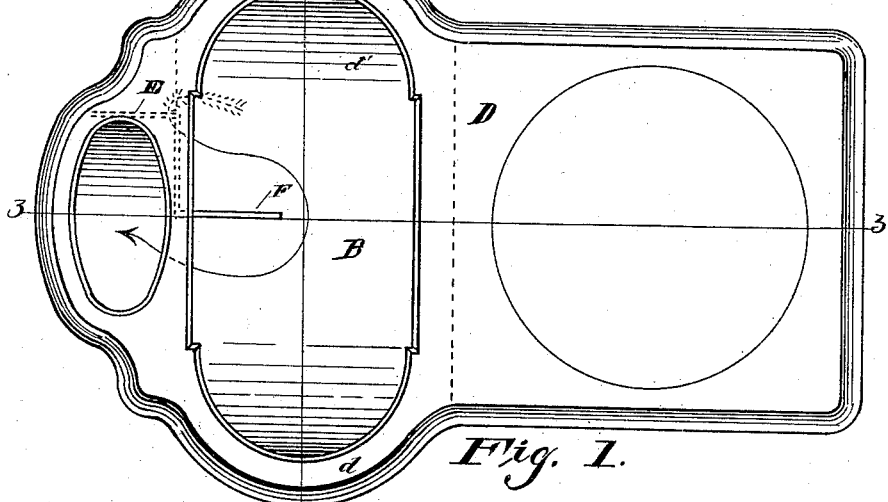

In the accompanying drawings, Figure 1 is a plan view of a stove embodying my improvement. Fig. 2 is a cross-section on line 2 2, Fig. 1. Fig. 3 is a longitudinal section on line 3 3, Fig. 1. Fig. 4 is a plan view of the bottom flue-plate shown in section in Figs. 2 and 3. Fig. 5 is a side elevation of one of the side plates of the stove, showing the cut-away portion above.

In adapting a stove to the double use indicated in the title, so as to have a heating-stove which is not disfigured by its convertibility into a cooking-stove, I have found the construction shown to be eminently practicable and satisfactory.

The stove here shown consists of a plain or ornamented body, A, of any usual or suitable dimensions. This body, I will say, is rectangular in general outline, and is cut away at $a$ on either side to make provision for the enlarged flue and heat chamber B, connected with or constituting the cooking part of the stove. This chamber is formed of the parts following: A bottom plate, C, shaped, say, in about the form shown in Figs. 2, 3, and 4, is fixed on the rear of the stove, so as to rest on the cut-away edges $a$ at the sides, and upon lugs or the like on the inside of the back plate, $b$, Fig. 3. The curved plate C extends laterally from the vertical sides of the body on which it rests in outward and upward curving lines, so as to form a chamber of considerably greater surface area than the width of the body alone would give, and of such depth and other conditions as to extend the heat area correspondingly. This gives a heating-surface for cooking which enables me to have two holes side by side laterally for vessels on a body which itself would be only wide enough to accommodate one such hole or opening in the top plate, D. The top plate, D, extends the entire length of the stove, and is enlarged or widened at $d$ to cover the chamber B. The heat in its passage to the pipe and chimney passes first through an opening, $c$, in the plate C, as seen in Fig. 4, and follows the line indicated substantially by the arrows in the several figures.

To prevent the heat from entering the pipe at once after passing through opening $c$, a curved division-plate, E, is interposed about the edge of the pipe-hole at one side and extending to the bottom plate, C, and a further division-plate, F, extends forward from the inner edge of the plate E to near about the center of the chamber B. The heat in its travel from the body of the stove is thus forced to travel first beneath, say, one half of the opening $d'$ in the stove-top, and thence around the division-plate F beneath the other half, before it is permitted to escape. A greater heating-surface is thus obtained, and the utility of the stove for heating purposes alone is considerably enlarged, which is of material advantage apart from other considerations; but the chief advantage of this construction is, as before stated, in the greatly enlarged facility for cooking on an otherwise small and compact stove-body.

It will of course be understood that the details of construction, as herein described, may be more or less modified and varied without departing from the spirit of the invention. The back of the stove, it will be seen, extends up to the top plate, and is flared outward at $h$, opposite the stove-pipe hole.

Having thus described my invention, what I claim as new, and desire to secure by Letters Patent, is—

1. A stove having substantially flat sides and ends, the sides cut away at their upper edge to provide for a heating-chamber, and a plate of greater width than the body of the stove, forming the front and sides of said chamber, with a flat stove-top covering the entire stove, substantially as set forth.

2. A box-stove having sides extending its entire length and cut away, as at a, in combination with a plate resting on said cut-away sides extending laterally beyond the same, and having its sides and front turned up to form walls for the heat-chamber, and a flat stove-top of irregular width to cover said heat-chamber and the front of the stove, substantially as set forth.

3. In a box-stove having a heat-chamber formed therein separate from the stove-body, the following elements in combination: straight sides cut away along their upper edges, as at a, a plate with upwardly-curved front and side portions wider than the stove-body and resting on the cut-away side portions and flush on top with the uncut edge thereof, said plate having an opening, as c, for the passage of heat into the heat-chamber, a flat stove-top covering the entire stove, and plates to direct the heat into the body of the heat-chamber, substantially as set forth.

In testimony whereof I have hereunto set my hand this 23d day of August, 1888.

JOHN McMASTER.

Witnesses:
 GEO. R. YOUNG,
 JOHN SHEA.